May 2, 1933.   A. WALLER   1,906,345
OIL SEDIMENTATION GAUGE
Filed Nov. 12, 1930   2 Sheets-Sheet 1
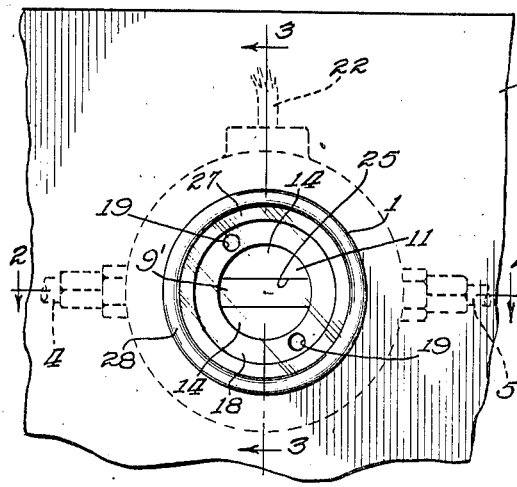
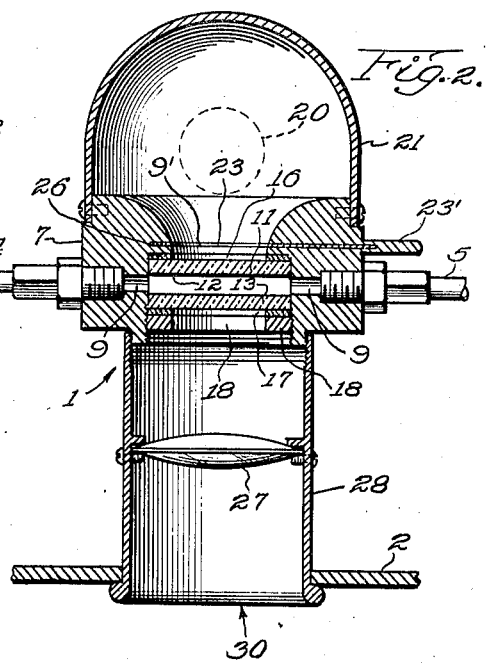
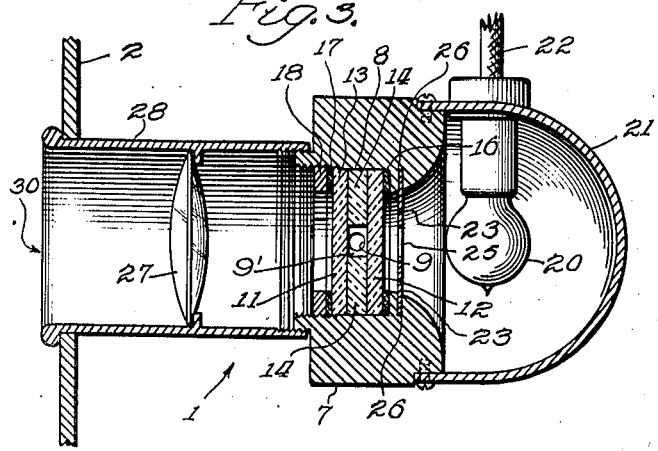
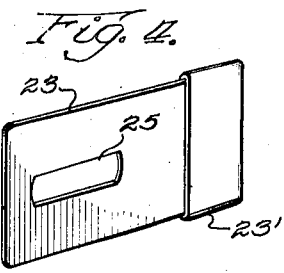
Inventor
Arthur Waller.
Witnesses May 2, 1933.  A. WALLER  1,906,345
OIL SEDIMENTATION GAUGE
Filed Nov. 12, 1930   2 Sheets-Sheet 2
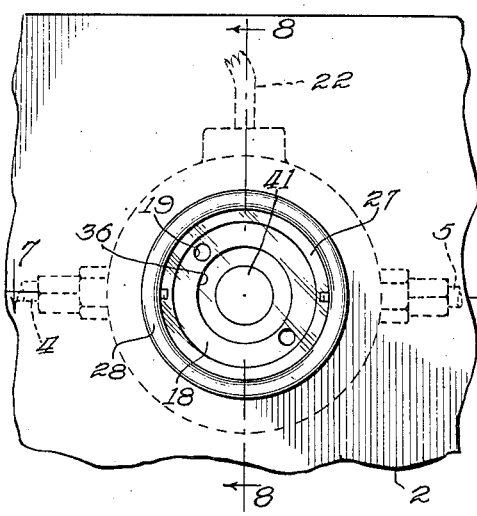
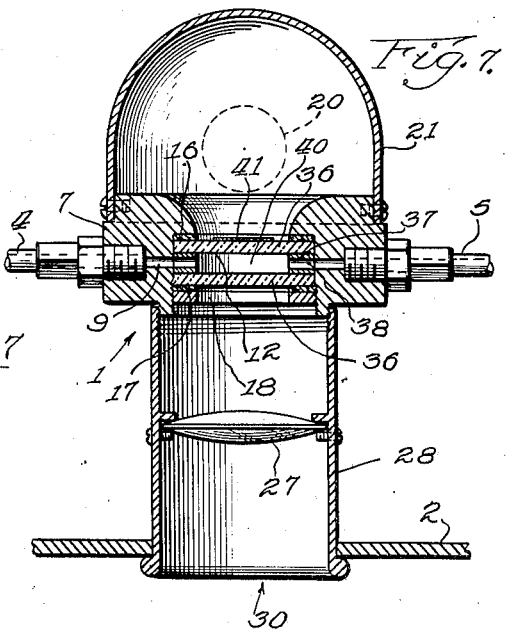
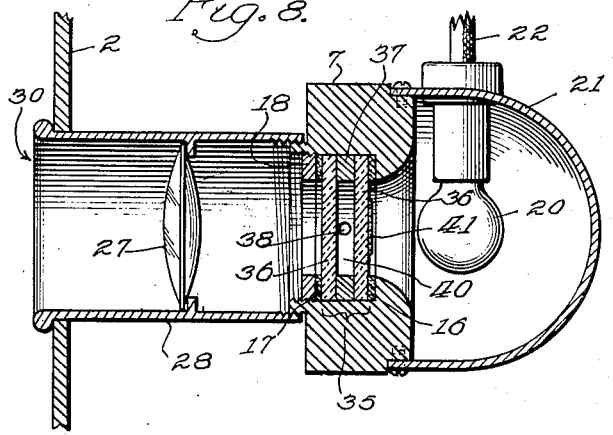
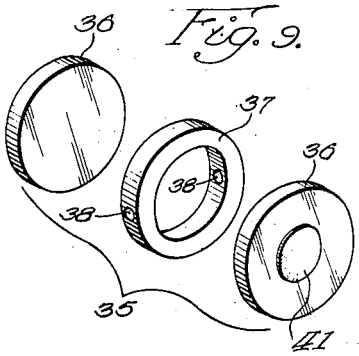
Inventor
Arthur Waller.

Patented May 2, 1933

1,906,345

UNITED STATES PATENT OFFICE

ARTHUR WALLER, OF CHICAGO, ILLINOIS

OIL SEDIMENTATION GAUGE

Application filed November 12, 1930. Serial No. 495,127.

This invention relates to oil sedimentation gauges, and more especially to means for visually determining the condition from time to time of the lubricating oil in an internal combustion engine or the like.

The main objects of the invention are to provide for ready visual observation and determination of the condition of the lubricating oil with respect to deterioration, sedimentation, discoloration and increased opacity incident to use; to provide ready comparison of the color of the oil with a predetermined or standard color; to provide for passing the oil or a part thereof through a visual inspection gauge in its course of circulation through the engine and oil pump; to provide for ready interchange of graded color screens or standards in such a gauge, according to the grades of oils used and the specific determinations desired; to provide in connection with such a gauge, light ray generating means arranged to enable transluminous inspection of the oil in relation to the gauge standard or screen; and to provide also for magnifying the material incident to its inspection, and at the same time avoid daylight reflection in the eyepiece.

This invention is illustrated by the accompanying drawings, in which:

Figure 1 is a face view of the preferred embodiment of my invention, as mounted on an instrument panel, the direction of oil flow through the gauge being indicated by the horizontal arrows adjacent to the inlet and outlet tubes respectively.

Fig. 2 is a horizontal axial section on the line 2—2 of Fig. 1.

Fig. 3 is a vertical axial section on the line 3—3 of Fig. 1.

Fig. 4 is a perspective view of an interchangeable standard color gauge member.

Fig. 5 is a perspective view of a transparent discoidal conduit cell, as of glass, having a diametric passageway for the oil.

Fig. 6 is similar to Fig. 1 except that a modified form of gauge is represented, the standard color element being discoidal and being centrally positioned, rather than comprising two parts disposed laterally of the oil passage, as in Fig. 1.

Fig. 7 is a horizontal axial section on the line 7—7 of Fig. 6.

Fig. 8 is a vertical axial section on the line 8—8 of Fig. 6.

Fig. 9 is a perspective view of the three-part conduit cell with the three main elements thereof separated somewhat to more clearly show the form of each, and one of the face plates having the standard color member secured centrally thereon.

Referring more in detail to the drawings and especially to Figures 1 to 5, the preferred embodiment here shown comprises a gauge 1 set in or upon the instrument panel 2 on the front part of an automobile, not shown, which gauge is connected in series with a lubricating oil circuit represented by the inlet pipe 4 and the outlet pipe 5 which are connected to the engine and to the oil pump, also not shown.

The frame 7 of the gauge is annuloidal in shape and has a main axial chamber 8 through which light may be transmitted and in which the gauge elements proper are mounted. This frame also has formed in its body the end parts of a diametric passageway 9 to which the said pipes 4 and 5 are connected for the transmission of oil through the gauge.

Mounted in the main aperture or chamber 8 is a composite glass element or cell 11, including a pair of similar plates 12 and 13 spaced apart with two filler blocks 14, one on each side of its diametric axis to provide the connecting medial part 9' of the conduit or passageway 9 to which the said tubes are connected. This glass unit as a whole is cushioned between a pair of gaskets 16 and 17 and is held in place by a threaded ring or nut member 18 having wrench engaging apertures 19.

Back of said frame 7 is a source of light, as for instance an electric lamp 20 housed in a shell 21 secured to said frame and energized through the electric cable 22. On one side of said cell 11, as for instance between it and the lamp, is a color standard or screen 23 consisting of translucent material in plate form and provided with a slot or opening 25 substantially co-extensive with the conduit way in said cell. Frame 7 is apertured at 26 to receive standard 23 or equivalent gauge means.

A double convex magnifying lens 27 is mounted in the tubular eyepiece 28; so that the visible characteristics of the oil are magnified, especially particles of dirt, carbon or other foreign matter.

In using the foregoing embodiment of my invention, a color standard is selected from a variety of such standards according to the quality of the oil to be used, and also according to the degree of discoloration which is to be considered permissible.

Having selected a standard it is inserted in the slide apertures 27 of frame 7. During the operation of the engine, the lubricating oil is pumped continuously through the gauge. Whenever it is desired to inspect the oil the lamp 20 is energized by means of an appropriate switch, not shown, and the eye is applied to the eye-piece as at 30. As the oil is inspected from time to time, it will be noted that it gradually becomes darker and darker, until it finally acquires substantially the same shade of color as the chosen standard 23, whereupon the oil may be adjusted so deteriorated, carbonized or worn out as to warrant renewal. Various factors affect the serviceable life of the oil as gauged by its color, including mainly carbonization from the cylinder and some degree of mechanical wear of the working parts.

Whenever it is deemed advisable to work the oil to a greater or less degree of carbonization, sedimentation, etc., the color screen or standard may be changed accordingly, a lighter shade being selected if frequent change of oil is deemed desirable or a darker shade if more exhaustive use of an oil charge is desired.

Owing to the magnifying property of the gauge, improper combustion, or operation of the cylinder in any way to affect the oil may be largely determined by visual inspection.

Referring to the modified form of gauge shown by Figures 6 to 9 inclusive, the same designation characters are used as above set forth, except as to parts or members which are modified substantially, in which case other numerals are applied.

In this instance the observation cell 35 comprises a pair of discoidal glass plates 36 and a glass spacer ring 37, the latter having a diametric passageway 38 to communicate with the inlet and outlet pipes 4 and 5. When these glass members are assembled, there is provided an oil chamber 40 through which the lubricating oil circulates during the operation of the engine.

In order to gauge the quality of the oil a standard color element or disk 41 is mounted exteriorly on one of the plates 36, where it is secured adhesively and preferably in a permanent manner, said disk being translucent, in order that sufficient light may pass therethrough to enable ready comparison of the oil therewith.

This unit or cell is mounted substantially the same as cell 11 of the preferred embodiment. In case a different standard is desired the color element 41 may be replaced by removal of the old one and applying a chosen new one, or if preferred a plurality of cells may be provided, each with a distinctive color standard attached thereto, for selective introduction into the gauge, as will be understood.

This gauge if desired may be so designed respecting the color standard that critical deterioration of the oil will be indicated by its turning so dark as to substantially obliterate the light rays falling on the color standard 41; it being understood that in using cell 35 all of the light passing through the color standard passes also through the oil.

Although this invention is variously illustrated, it is to be understood that some of the details set forth may be altered or omitted without departing from the spirit of the invention as defined by the following claims.

I claim:

1. In a gauge of the class described, a chambered member comprising two plates of glass spaced apart sufficiently to provide a thin passageway, and a pair of glass filler blocks separating said plates and determining the width of said passageway, in combination with a color screen to overlie said member, and having a slot substantially coextensive with the said passageway.

2. In an oil gauge of the character described, a transparent cell comprising a pair of discoidal plates thinly spaced apart in combination with a diametrically perforated ring interposed between said plates whereby oil circulation may be established through the inspection chamber formed by said members, one of said plates having a standard color member affixed centrally thereto.

Signed at Chicago this 6th day of November 1930.

ARTHUR WALLER.